United States Patent
Norrad

Patent Number: 5,579,601
Date of Patent: Dec. 3, 1996

[54] ANIMAL TRAP

[76] Inventor: Clinton C. Norrad, Box 297, Boiestown, New Brunswick, Canada, E2H 1A0

[21] Appl. No.: 402,370

[22] Filed: Mar. 13, 1995

[30] Foreign Application Priority Data

Mar. 21, 1994 [CA] Canada .................. 2119523

[51] Int. Cl.⁶ .......................... A01M 23/14; A01M 23/08
[52] U.S. Cl. ........................................ 43/64; 43/65
[58] Field of Search .................. 43/64, 65, 67, 43/69, 71, 121, 60

[56] References Cited

U.S. PATENT DOCUMENTS

| | | |
|---|---|---|
| 2,042,349 | 5/1936 | McGhee . |
| 2,252,908 | 8/1941 | Wittlief . |
| 2,496,708 | 2/1950 | Fuller . |
| 3,528,190 | 9/1970 | Voorhees . |
| 3,528,191 | 9/1970 | Hand ........................................ 43/64 |
| 3,591,972 | 7/1971 | Hess . |
| 4,356,655 | 11/1982 | Morante et al. . |
| 4,388,755 | 6/1983 | Wright ........................................ 43/69 |
| 4,388,775 | 6/1983 | Wright . |
| 4,610,105 | 9/1986 | Chandler .................................... 43/69 |
| 5,406,741 | 4/1995 | Little et al. ................................ 43/64 |

FOREIGN PATENT DOCUMENTS

| | | | |
|---|---|---|---|
| 549800 | 12/1957 | Canada ...................................... 43/64 |
| 2901832 | 7/1980 | Germany .................................... 43/65 |
| 526444 | 9/1940 | United Kingdom ...................... 43/64 |
| 8001748 | 9/1980 | WIPO ........................................ 43/64 |

*Primary Examiner*—Joseph J. Hail, III
*Assistant Examiner*—I.-H. Lin
*Attorney, Agent, or Firm*—McFadden, Fincham

[57] ABSTRACT

A trap for animals having an apertured cover for positioning on a container containing a fluid. The cover includes a walkway on which an animal may walk. An attractive chemical scent is inaccessibly disposed beneath the walkway and adjacent an animal receiving aperture. A pivotal ball or cylinder is connected to the cover within the container. Once the animal falls through the aperture, it cannot escape and eventually drowns.

18 Claims, 2 Drawing Sheets

5,579,601

ANIMAL TRAP

FIELD OF THE INVENTION

The present invention relates to an animal trap and more particularly, the present invention relates to an improved animal trap having less parts and improved arrangement for attracting an animal to dispose of the same in a humane way.

BACKGROUND OF THE INVENTION

The prior art has set forth numerous arrangements for disposing of animals, many of which primarily incorporate food bait which requires handling, changing and other maintenance. This limitation is compounded by complicated traps employing many moving parts. Generally, the greater level of complication of the apparatus, the greater the possibility of failure.

Typically of the prior art arrangements is U.S. Pat. No. 4,388,775. This reference teaches the use of a trap which requires replaceable bait. This is disadvantageous since the bait must be replaced. Further, the apparatus includes an interior foraminous or mesh liner; such an arrangement would appear to be inappropriate since the animal may use this to escape, thus defeating the purpose of the trap.

U.S. Pat. No 4,356,655, issued to Morante et al., provides an animal trap having a variety of mechanical members including a treadle.

Voorhees, in U.S. Pat. No. 3,528,190, discloses a death chamber for rodents and other pests. The apparatus provides a sliding lid having springs associated therewith. The lid and springs are not covered to any extent and accordingly, the arrangement is susceptible to the elements thus limiting its usefulness in various climates.

In view of what the prior art has proposed, there exists a need for an improved animal trap which is unaffected by different weather conditions, employs a simple arrangement and further which does not employ food type bait. The present invention is directed to satisfying these features delineated above together with a host of others.

SUMMARY OF THE INVENTION

One object of the present invention is to provide an improved and humane animal trap.

A further object of one embodiment of the present invention is to provide an animal trap for connection with a container containing a liquid comprising: a cover member having connection means for connection with an open end of a container, the cover including: a walkway on which an animal may walk; at least one opening in the walkway for receiving an animal to be trapped; animal attractant means adjacent to and spaced from the at least one opening, vent means in the walkway and adjacent the animal attractant means for exposing the attractant means to an animal to be attracted; and hood means releasably engageable with the cover means, the hood means for sheltering the cover.

Conveniently, the trap according to the present invention, may be used above or below ground as well as in water for trapping aquatic animals. As such, the container to which the cover member may be releasably connected can take many forms, e.g. square, cylindrical, etc. Where the trap is employed in water, the container and/or cover may include flotation devices for buoyant arrangements or ballast for low water level areas, e.g. ponds, streams, etc.

A further object of the present invention is to provide an animal trap comprising: a container having an open top; a cover member having connection means for connection with the open top of the container, the cover member including: a walkway on which an animal may walk; a plurality of openings in spaced relation in the walkway, the openings for receiving an animal therein; inaccessible animal attractant means for attracting an animal, the attractant means being adjacent to and spaced from the openings such that an animal cannot gain access to the attractant means; a plurality of vents positioned in the walkway adjacent the openings; and an auxiliary attractant means movably mounted within the container and beneath the openings, the auxiliary attractant means being movable such that an animal passing through an opening can not escape from within the container.

In a preferred embodiment, the attractant comprises a suitable olfactory stimulant attractive to the animal in the form of a volatile compound associated with a suitable substrate, e.g. foam.

Various scents may be employed and selection will be based on the animal to be trapped.

To complement the scented non-food attractant, the trap may incorporate a coloured member in the form of a semi-sphere or cylinder. This arrangement provides a visual "food-like" stimulus to attract the animal into the trap for inescapable retention therein.

In synopsis, the animal trap according to the various embodiments provides for a greater range of applicability than those set forth in the prior art. Advantageously, the trap may be employed in a variety of climates, avoids the use of food baits and controls, by animal entrance sizes, the size of animal to be trapped and circumvents known arrangements by reducing mechanical complexity.

Having thus generally discussed the invention, reference will now be made to the accompanying drawings illustrating preferred embodiments.

DETAILED DESCRIPTION OF THE PREFERRED EMBODIMENTS

Figure 1:
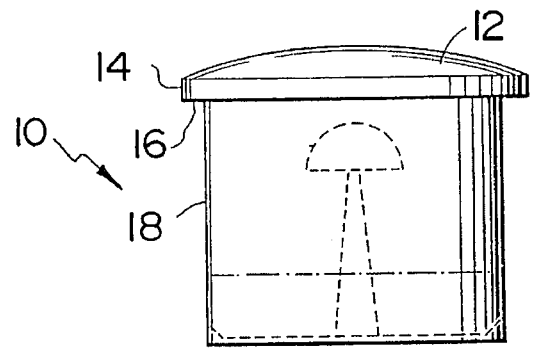
FIG. 1 is a side elevational view of the trap according to a first embodiment.

Referring now to the drawings, the trap, generally denoted by numeral 10, is shown in a first embodiment in side view in FIG. 1. The trap 10 includes a dome-shaped hood 12 having a peripheral edge 14 and underside 16. The hood 12 is releasably connected to an open top container 18 (discussed hereinafter in greater detail) such that the peripheral edge 14 of hood 12 extends beyond the edge of the container top. In this manner, the edge 14 acts as an eavestrough. A dunking arrangement (discussed hereinafter) is shown in outline within container 18.

Figure 2:
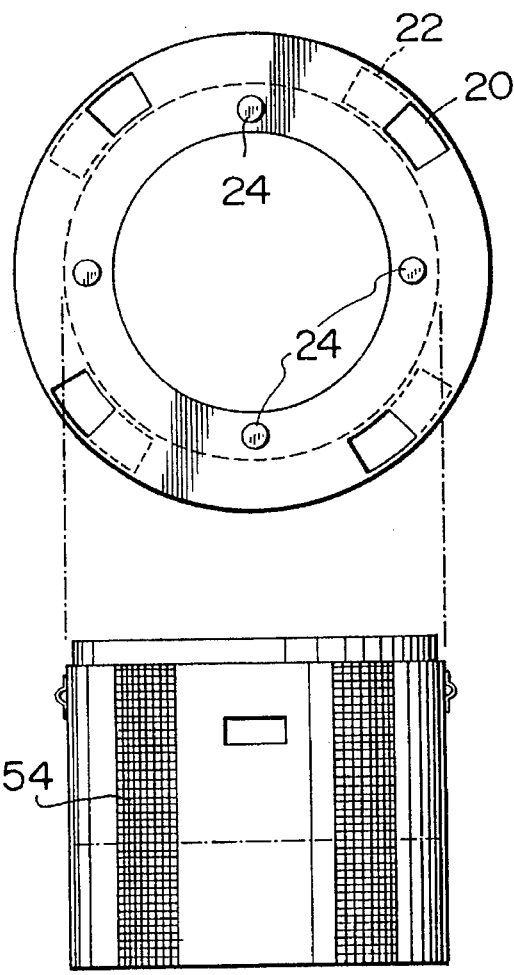
FIG. 2 is an exploded view of the trap assembly with the hood shown in front elevation.

Underside 16 includes a plurality of spaced apart slots 20 for permitting an animal to enter. This is illustrated in FIG. 2. The slots 20 may be adjusted in size to accommodate smaller or larger animals by, for example, a concentric ring 22 positioned beneath the slots 20.

Figure 3:
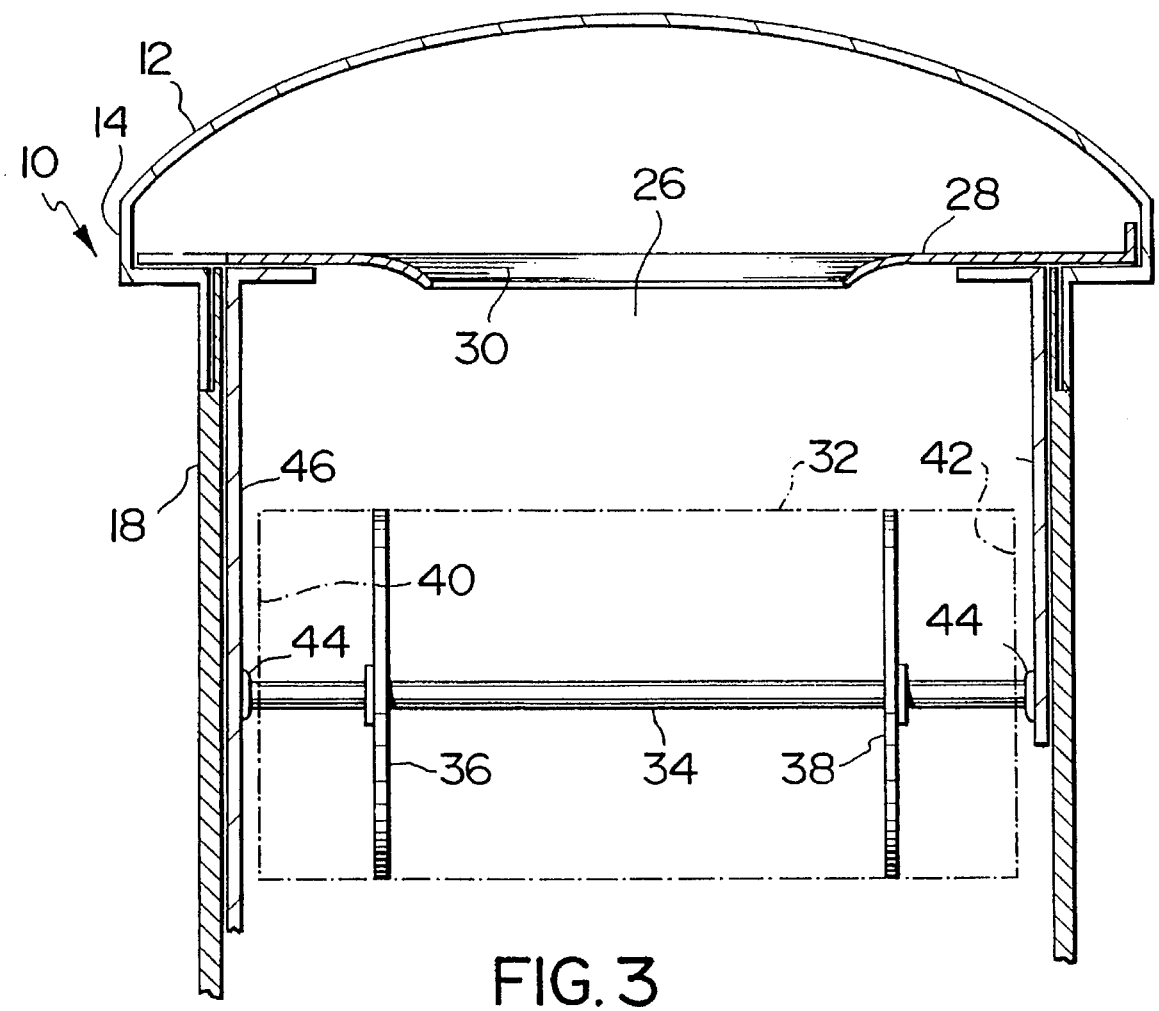
FIG. 3 is a cross-sectional view of the trap.

The hood 12 includes a plurality of spaced apart scented foam pads 24 spaced inwardly of hood 12 toward a main central opening 26. Pads 24 are positioned to be inaccessible by an animal. FIG. 3 illustrates a cross-sectional view of the apparatus with the hood 12 as positioned on a container.

As is illustrated in FIGS. 2 and 3, the adjustable slots 20, scent pads 24 and the central opening 26 are in a spaced coaxial arrangement. This arrangement provides an interior walkway 28 on which an animal way walk.

Central opening 26 includes a downwardly turned lip 30. The opening 26 provides the only possible access to the scent pads 24, however, the opening 26 is large enough so that the animal, in an attempt to gain access to pads 24, will fall through opening 26.

In order to complement the attraction of pads 24, the trap 10, further includes a movable member 32, in this embodiment a cylinder. The exterior of cylinder 32 may include a textured surface or colouring to simulate the appearance of food to further attract an animal on walkway 28.

A central axle 34 and two spaced apart supports 36,38 are included. Axle 34 extends beyond end walls 40 and 42 of cylinder 32. Axle 34 is rotatably received in mountings 44, having supports 46 integrally associated with and connected to cover 12.

Figure 4:
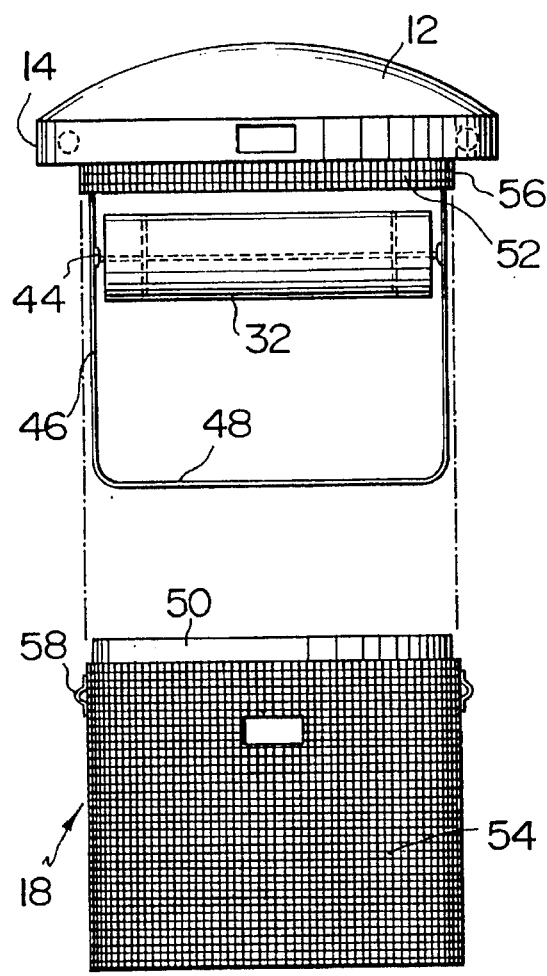
FIG. 4 is an exploded view of the trap assembly.

FIG. 4 illustrates an exploded view of the hood member 12 as the same is connected with a container 18. In this embodiment, the support 46 extends a downwardly and includes at the terminal ends thereof, a tray 48. The tray 48 will generally subscribe to the shape of the container and may be foraminous or otherwise apertured to permit a drowned animal to be lifted out (not shown) while the liquid drains as the hood member 12 is lifted out of container 18.

In order to facilitate releasable connection between hood 12 and container 18, the container 18 includes an inwardly spaced rim 50 which is frictionally received by sleeve 52 of hood 12. As an added feature, the above ground trap arrangements may include a mesh exterior 54 on the exterior of container 18. A variation on complete mesh coverage is shown in FIG. 2, where mesh strips are employed. Additionally, hood 12 on sleeve 52 thereof may include a mesh material 56 to assist an animal into hood 12.

Eyelets 58 may additionally be included in order for a user to secure the trap 10 to, for example, a substrate, the ground, etc.

Figure 5:
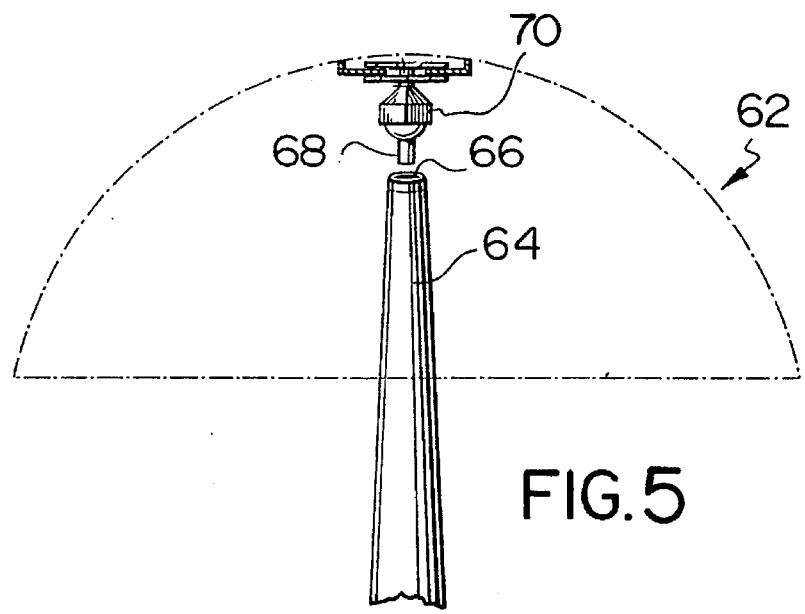
FIG. 5 is an enlarged view of one embodiment of the movable member.

In a further embodiment, shown in FIG. 5, the movable arrangement may comprise a universally tiltable semi-circular member 62, which may be coloured or textured to have the appearance of food.

In order to support member 62, a standard 64 is provided and extends downwardly for connection with tray 48. This is generally shown in dashed lines in FIG. 1.

The standard 64 includes a socket 66 for receiving a projection 68 extending from a generally spherical mounting 70. The mounting 70 is positioned interiorly of the semi-circular member 62.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. An animal trap for connection with a container containing a liquid comprising:

a cover member having connection means for connection with an open end of a container, said cover including:
  a walkway within said cover on which an animal may walk;
  at least one opening in said walkway for receiving an animal to be trapped;
  a movable member positioned beneath said at least one opening for preventing escape of an animal, said movable member connected to said cover member;
  animal attractant means adjacent to and spaced from said at least one opening;
  vent means in said walkway and adjacent said animal attractant means for exposing said attractant means to an animal to be attracted; and
  dome-shaped hood means extending outwardly beyond said connection means of said cover member.

2. The animal trap as set forth in claim 1, wherein said movable member comprises a universally tiltable semicircular member.

3. The animal trap as set forth in claim 1, wherein said movable member comprises a rotatable cylinder.

4. The animal trap as set forth in claim 1, wherein said walkway, said at least one aperture, said attractant means, and said vent means are coaxially disposed in said cover.

5. The animal trap as set forth in claim 1, wherein said animal attractant means comprises scented attractant means.

6. The animal trap as set forth in claim 5, wherein said scented attractant means includes a substrate onto which is disposed scented attractant.

7. The animal trap as set forth in claim 5, wherein said attractant means is inaccessible by an animal.

8. An animal trap comprising:

a container having an open top;

a cover member having connection means for connection with said open top of said container, said cover member including:
  a walkway within said cover on which an animal may walk;
  a plurality of openings adjustable in size and in spaced relation in said walkway, said openings for receiving an animal therein;
  inaccessible animal attractant means for attracting an animal, said attractant means being adjacent to and spaced from said openings such that an animal cannot gain access to said attractant means;
  a plurality of vents positioned in said walkway adjacent said openings; and
  an auxiliary attractant means movably mounted within said container and beneath said openings, said auxiliary attractant means being movable such that an animal passing through an opening cannot escape from within said container.

9. The animal trap as set forth in claim 8, wherein said auxiliary attractant means comprises a universally tiltable sem-icircular member, said member having a food-like appearance.

10. The animal trap as set forth in claim 8, wherein said animal trap further includes a hood member for releasable mounting to said cover member.

11. The animal trap as set forth in claim 8, wherein said container is mounted in ground.

12. The animal trap as set forth in claim 8, wherein said animal trap includes flotation means for permitting said trap to float in water.

13. The animal trap as set forth in claim 8, wherein said container is mounted above ground.

14. The animal trap as set forth in claim 13, wherein said trap includes tie means for tying said trap to the ground.

15. The animal trap as set forth in claim 13, wherein said trap includes a foraminous liner for permitting an animal to climb onto said cover.

16. An animal trap comprising:

a container having an open top and a liquid therein;

a cover for releasable connection with said container, said cover including:

a covered walkway within said cover on which an animal may walk;

at least one adjustable opening in said walkway for receiving an animal to be trapped;

animal attractant adjacent to and spaced from said at least one opening;

perforations in said walkway adjacent said animal attractant for exposing said attractant to an animal to be attracted; and a hood member positioned over said cover and extending outwardly of said cover beyond said container.

17. The animal trap as set forth in claim 16, said trap further including an auxiliary attractant member.

18. The animal trap as set forth in claim 17, wherein said auxiliary attractant member comprises a movable member.

* * * * *